United States Patent [19]

Shah

[11] Patent Number: 6,130,083

[45] Date of Patent: Oct. 10, 2000

[54] METHOD OF REDUCTION OF NITROAROMATICS BY ENZYMATIC REACTION WITH REDOX ENZYMES

[75] Inventor: Manish M. Shah, Richland, Wash.

[73] Assignee: Battelle Memorial Institute, Richland, Wash.

[21] Appl. No.: 09/200,642

[22] Filed: Nov. 24, 1998

[51] Int. Cl.[7] .................................................. B09B 3/00
[52] U.S. Cl. ............................................... 435/262.5
[58] Field of Search ........................................ 435/262.5

[56] References Cited

U.S. PATENT DOCUMENTS 4,535,162   8/1985   Mestroni et al. .................. 546/159
5,777,190   7/1998   Shah et al. ........................ 588/202

OTHER PUBLICATIONS

"Purification and Characterization of Nitrobenzene Nitroreductase from Pseudomonas pseudoalcaligenes JS45" (Sommerville, C., Nishino, S.F., and Spain, J.C. (1995) J. Bacteriol., 177, 3837–3842).

*Primary Examiner*—David A. Redding

[57] ABSTRACT

A method for the controlled reduction of nitroaromatic compounds such as nitrobenzene and 2,4,6-trinitrotoluene by enzymatic reaction with redox enzymes, such as Oxyrase (Trademark of Oxyrase, Inc., Mansfield, Ohio).

9 Claims, 3 Drawing Sheets

METHOD OF REDUCTION OF NITROAROMATICS BY ENZYMATIC REACTION WITH REDOX ENZYMES

This invention was made with Government support under Contract DE-AC06-76RLO 1830 awarded by the U.S. Department of Energy. The Government has certain rights in the invention.

FIELD OF THE INVENTION

The present invention relates generally to a method for the controlled reduction of nitroaromatic compounds by enzymatic reaction with redox enzymes.

BACKGROUND OF THE INVENTION

Methods for reducing nitroaromatic compounds have received interest as the products from the partial or total reduction of those nitroaromatic compounds have found an expanding variety of uses. These uses include drug intermediates, antibiotics, pesticides, herbicides, radiosensitizers and explosives which may be produced with nitroaromatics as starting materials. As used in these applications, the nitroaromatic compounds are partially or totally reduced as part of the processing required for production of the final product.

Additionally, nitroaromatic compounds in many circumstances have been proven to create environmental or health hazards. For example, nitrobenzene has been shown to cause headaches, drowsiness, nausea, vomiting and methemoglobinemia with cyanosis. Nitrobenzene has also been shown to be toxic to rats with LD50 of 640 mg/kg.

The current stockpile of energetic materials requiring resource recovery or disposition (RRD) is 449,308 tons. Through 2001, over 1.2 million tons will pass through or reside in the RRD account (Joint Ordnance Commands Group; 1995). A totally different but significantly similar challenge exists in clean-up of the sites where soil and ground water are contaminated with TNT, RDX, HMX, and other nitro-based explosives. Hence, there is a need for characterizing the reactions of explosives with naturally occurring enzymes, and a cost-effective technology to degrade these contaminants.

To take advantage of the potential uses of partially and totally reduced nitroaromatic compounds, and to eliminate nitroaromatic compounds in circumstances where they pose environmental or health risks, a variety of processing schemes have been developed to bring about the partial or total reduction of these nitroaromatic compounds. Many such schemes involve the use of naturally occurring enzymes to catalyze the reduction. Such schemes are highly advantageous as the enzymes are often readily obtainable and their use as catalysts minimizes undesirable waste and byproducts. An example of the use of such enzymes is provided by Sommerville (Sommerville, C., Nishino, S. F., and Spain, J. C. (1995) J. Bacteriol., 177, 3837–3842), wherein it was demonstrated that nitrobenzene may be reduced to phenylhydroxylamine through the use of oxygen insensitive nitrobenzene reductase as a catalyst. Schemes such as that described in Sommerville are characterized by an inability to control the reduction using a simple inhibitor such as molecular oxygen and further, that they require the use of NADPH, an expensive reductant. However, it is often desirable that the reduction of the nitro groups not be allowed to progress to completion, as it is desirable to isolate or collect a partially reduced product.

U.S. Pat. No. 5,777,190 to Shah et al., is directed to a method for the controlled reduction of nitroaromatic compounds such as nitrobenzene and 2,4,6-trinitrotoluene (TNT) by enzymatic reaction with oxygen sensitive nitroreductase enzymes, such as ferredoxin NADP oxidoreductase. Through the addition of oxygen, the reduction of nitroaromatic compounds may be halted at the point at which a partially reduced product has been produced. Again, a disadvantage of this process is that it uses expensive cofactors like nicotinamide adenine dinucleotide phosphate (NADPH) for TNT reduction.

Hence, there remains a need for a cost-effective method of controlled reduction of nitroaromatic compounds.

SUMMARY OF THE INVENTION

Accordingly, it is an object of the present invention to provide an inexpensive redox enzyme and cofactors which will catalyze the reduction of nitroaromatic compounds using an organic non-aromatic reductant. It is further an object of the present invention to provide a redox enzyme which, in the presence of oxygen, will stop the catalytic reduction. In this manner, the reduction of nitroaromatic compounds may be halted by the addition of oxygen at the point when a partially reduced product has been produced. Oxygen may be provided either alone or in a mixture of gasses such as air. The desired partially reduced product may then be isolated and utilized in a variety of end uses.

The objects of the present invention are thus accomplished by providing a redox enzyme which will catalyze the reduction of nitroaromatic compounds in the absence of oxygen but will not catalyze the reduction of nitroaromatic compounds in the presence of an excess of oxygen. Thus, redox enzyme, as used herein, refers to the characteristic that in the absence of oxygen, the redox enzyme will catalyze the reduction of nitroaromatic compounds while in the presence of oxygen the redox enzyme will not catalyze the reduction of nitroaromatic compounds. Therefore, a system using redox enzyme to catalyze the reduction of nitroaromatic compounds affords a simple mechanism whereby the addition of oxygen will prevent the reaction from progressing to completion and allow the isolation of partially reduced products.

The present invention is thus made possible by the discovery that ubiquitous redox enzymes found in bacteria, specifically e. coli as obtained as Oxyrase (Trademark of Oxyrase, Inc., Mansfield, Ohio) taken from membranes of e. coli, will catalyze the reduction of nitroaromatic compounds using organic non-aromatic reductants. While the present invention directly demonstrates the redox enzyme from e. coli membrane in the reduction of 2,4,6-trinitrotoluene, the present invention is in no way limited to this specific example. Indeed, the present invention contemplates the use of any redox enzyme in the catalytic reduction of any nitroaromatic compound. Redox enzymes may thus be identified by the mechanism of reduction.

In general, the mechanism of reduction of nitroaromatic compounds by redox enzymes may be either one or two electron based. Redox enzymes that catalyze the reduction of nitroaromatics via one electron based reduction are generally oxygen sensitive. In the presence of oxygen, the redox enzymes reduce molecular oxygen to a superoxide anion radical using the nitroaromatic chemical as an electron mediator. Thus, in the presence of oxygen, redox enzymes will not catalyze the reduction of nitroaromatic compounds.

The subject matter of the present invention is particularly pointed out and distinctly claimed in the concluding portion of this specification. However, both the organization and method of operation, together with further advantages and

DESCRIPTION OF THE PREFERRED EMBODIMENT(S)

Figure 1:
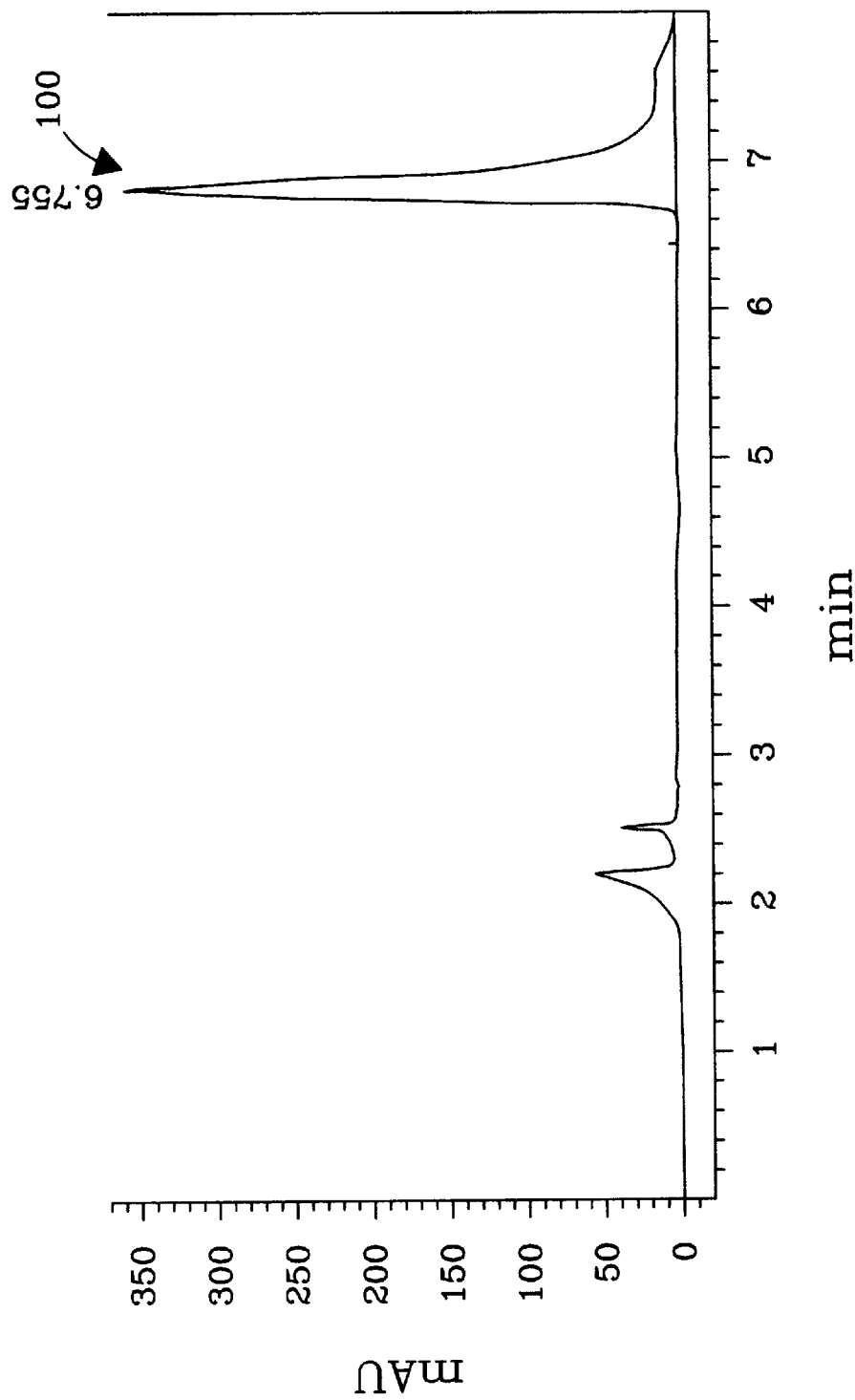
FIG. 1 is a chromatogram of a control sample containing TNT, Tris/NaLactate buffer, but no redox enzyme.

In a preferred embodiment of the present invention, a nitroaromatic compound is combined with a redox enzyme in an environment substantially free of oxygen, thereby causing the catalytic reduction of the nitroaromatic compound with organic non-aromatic reductant. The mixture environment preferably includes water and a buffer. The buffer may have any pH, but typically has a pH from 4 to 10. The reaction may be stopped by the addition of oxygen. Oxygen may be provided as a pure gas, or as a mixture with other gasses. Thus, air is a suitable oxygen source. Nitroaromatic compounds which may be reduced by the present method include, but are not limited to, nitrobenzene, orthochloronitrobenzene, orthoaminophenolonitrobenzene, 2,4,6-trinitrotoluene, 2,4-dinitrotoluene, and combinations thereof. Preferred redox enzymes are selected as having an ability to catalyze reduction via a one or two electron based process and are preferably membranes of *e. coli* and most preferably Oxyrase.

Advantages in incubation of the mixture include that the temperature of the mixture may be room temperature. Lower or higher temperatures may be used to the physical limits (freezing, boiling, thermal degradation) of the mixture. The incubation time is dependent on the kinetics of the reaction and could vary depending on amount of enzyme or TNT in the sample.

The organic non-aromatic reductants include but are not limited to anoic acids and their salts, aldehydes, and combinations thereof. Examples of anoic acids include methanoic acid (formic acid), ethanoic acid (pyruvic acid), ethandioic acid (oxalic acid), butanoic acid (butyric acid), lactic acid, and succinic acid. Examples of aldehydes include methanol (formaldehyde), ethanol (acetalaldehyde), xylose, glucose, and cellobiose.

EXPERIMENT 1

An experiment was conducted to demonstrate the efficacy of a preferred embodiment of the present invention.

An experimental control mixture was prepared by adding together all reagents except for the redox enzyme. The reagents are of analytical grade. The experimental control mixture contained the nitro-aromatic compound TNT and TRIS/NaLactate buffer pH 8.03 (TRIS or TRIZMA (tris) is hydroxymethyl aminomethane) in the amounts and concentrations shown in the following table:

MIXTURE TABLE I

| | CONTROL MIXTURE | |
|---|---|---|
| Component | Amount | Initial Concentration |
| TNT | 0.2 ml | 1.0 mg/ml |
| Water | 0.5 ml | |
| TRIS/NaLactate buffer pH 8.03 | 0.7 ml | 50/60 mM |
| Oxyrase Enzyme | 0.0 ml | 0.0 U/ml |
| TOTAL VOLUME | 1.4 ml | |

Oxyrase Unit Definition: One unit (U) will reduce dissolved oxygen (in 1 ml of air saturated with 40 mM phosphate buffer pH 8.3 at 37° C.) at the rate of 1%/second.

A redox enzyme reaction mixture was also prepared containing all reagents including the redox enzyme in the amounts and concentrations as shown in the following table:

MIXTURE TABLE II

| | REACTION MIXTURE | |
|---|---|---|
| Component | Amount | Initial Concentration |
| TNT | 0.2 ml | 1.0 mg/ml |
| Water | 0.5 ml | |
| TRIS/NaLactate buffer pH 8.03 | 0.7 ml | 50/60 mM |
| Oxyrase Enzyme | 0.6 ml | 30 U/ml |
| TOTAL VOLUME | 2 ml | |

Oxyrase Unit Definition: One unit (U) will reduce dissolved oxygen (in 1 ml of air saturated with 40 mM phosphate buffer pH 8.3 at 37° C.) at the rate of 1%/second.

The mixtures were incubated at room temperature for twenty-four hours. The TNT in the redox enzyme reaction mixture transformed into one major metabolite, 4-Hydroxylamino-2,6-dinitrotoluene (4HADNT). The mixtures were analyzed for the presence of TNT and the reduction product 4HADNT. TNT and 4HADNT were identified by running the mixtures on a high performance liquid chromatography (HPLC) with a diode array detector (HP 1090, Hewlett-Packard, Palo Alto, Calif.). The retention times and absorbance levels of TNT and 4HADNT were compared between the experimental control mixture and the redox enzyme reaction mixture. The UV-VIS spectra of the redox enzyme reaction mixture was compared with the UV-VIS spectra of an authentic standard of 4HADNT. A reversed phase HPLC column (ODS Ultraspere, 5 micron) with dimensions of 4.6 mm ID×25 cm was used for separation. Methanol and water were used as the mobile phase at a ratio of 50:50 with a flow rate of 1 ml/min. The absorbance of eluents of the column was monitored at 230 nm.

The authentic standard of 4HADNT was verified by purchasing (from SRI, International) a sample of 4HADNT and running it on the same HPLC with diode array detector as the mixtures above. The identity of the purchased sample of 4HADNT was confirmed using chemical ionization and electron impact mass spectrometry. Its purity was determined to be 90% based on HPLC analysis.

Figure 2:
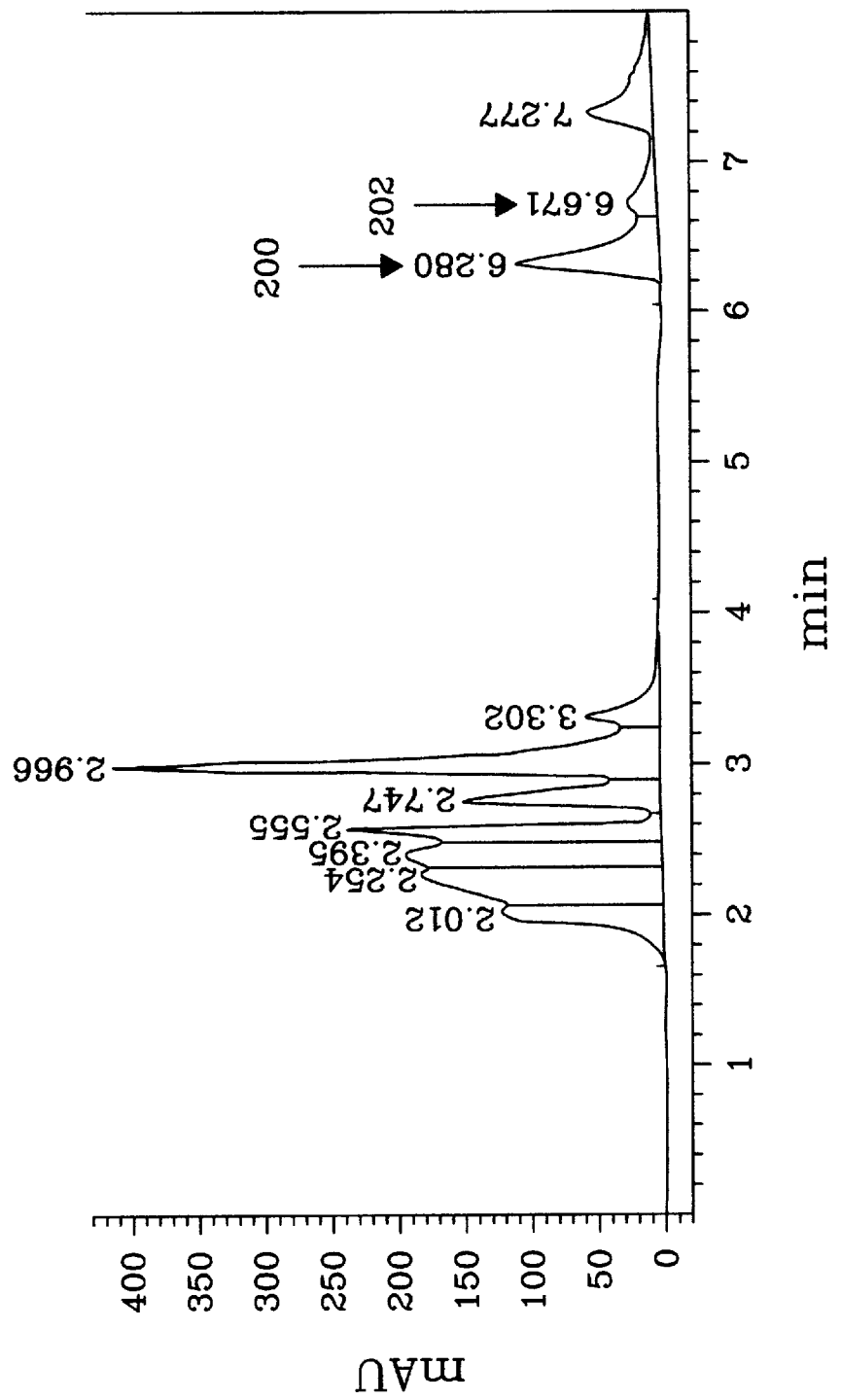
FIG. 2 is a chromatogram of the products of TNT enzymatically reduced with redox enzyme in a sample which contained TNT, Tris/NaLactate buffer, and redox enzyme as a preferred embodiment of the present invention.
Figure 3:
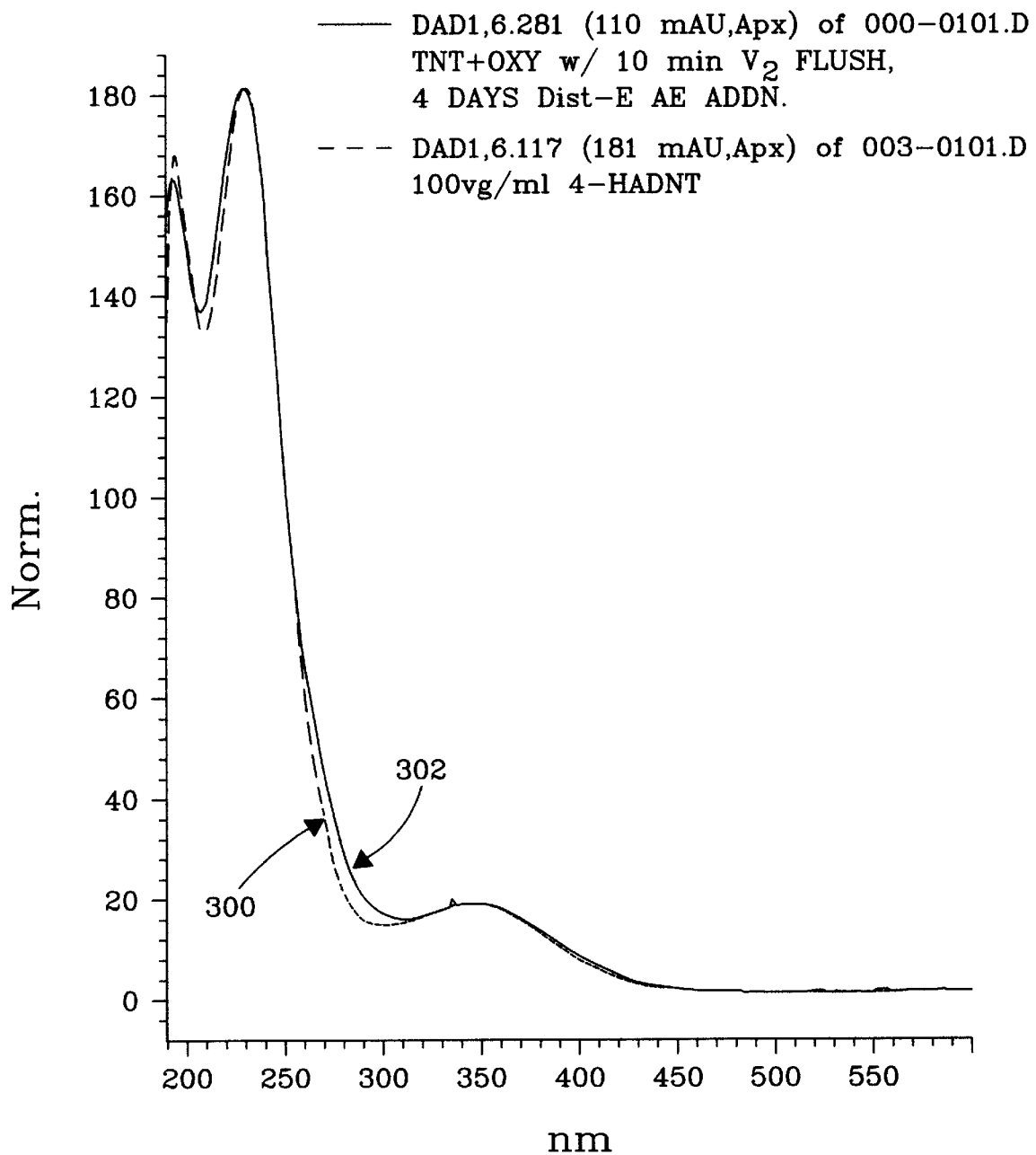
FIG. 3 is a UV-VIS spectrum comparing the 4-Hydroxylamino-2,6-dinitrotoluene (4HADNT) standard with the metabolite of TNT after the redox enzyme treatment described in the experiment demonstrating the preferred embodiment of the present invention.

FIG. 1 shows a chromatogram of the control sample containing TNT, Tris/NaLactate buffer, but no redox enzyme. The peak 100 shows the presence of TNT detected at a level of 354.3 mAU (milli-Absorbance-Units) with a retention time of 6.755 minutes. FIG. 2 shows a chromatogram of the products of TNT enzymatically reduced with redox enzyme in a sample containing TNT, Tris/NaLactate buffer, and redox enzyme. Peak 200 shows the presence of 4HADNT, the main product of the reduced TNT, detected at a level of 107.9 mAU with a retention time of 6.280 minutes. Peak 202 shows the presence of TNT at a reduced level of 22.9 mAU with a retention time of 6.671 minutes. FIG. 3 then shows a UV-VIS spectrum comparing the 4HADNT authentic standard prepared beforehand with the reduced TNT mixture after the redox enzyme treatment described above. The tracking of the two spectra verifies that the product formed by the TNT reduction is indeed 4HADNT. The dotted line 300 is a spectrum of the standard 4HADNT, and the solid line 302 is a spectrum of the TNT-redox enzyme mixture after reduction.

These results demonstrate that the nitroaromatic compound is reduced by the redox enzyme using an organic reductant such as NaLactate. The reduction leads to production of nitroaromatic intermediates. Specifically, the nitro group (—$NO_2$) is reduced. The reduction of the nitro group (—$NO_2$) could lead to either nitroso (—NO), hydroxylamine (—NHOH), or amine (—$NH_2$). In the current case, the major product is 4HADNT from TNT through reduction of the nitro group (—$NO_2$).

We claim:

1. A method for reducing nitroaromatic compounds comprising the steps of:
   a) providing a nitroaromatic compound,
   b) providing a redox enzyme,
   c) combining said nitroaromatic compound and said redox enzyme with an organic non-aromatic reductant, thereby causing the catalytic reduction of said nitroaromatic compound.

2. The method as recited in claim 1 wherein said organic non-aromatic reductant is selected from the group consisting of anoic acids, the salts of said anoic acids, aldehydes, and combinations thereof.

3. The method as recited in claim 2 wherein said anoic acids are selected from the group consisting of methanoic acid (formic acid), ethanoic acid (pyruvic acid), ethandioic acid (oxalic acid), butanoic acid (butyric acid), lactic acid, and succinic acid.

4. The method as recited in claim 2 wherein said aldehydes are selected from the group consisting of methanol (formaldehyde), ethanol (acetalaldehyde), xylose, glucose, and cellobiose.

5. The method as recited in claim 1 further comprising the step of providing oxygen during said catalytic reduction thereby stopping the progress of said catalytic reduction and allowing the collection of a partially reduced product of said nitroaromatic compound.

6. The method as recited in claim 1 wherein said nitroaromatic compound is selected from the group comprising nitrobenzene, orthochloronitrobenzene, orthoaminophenolonitrobenzene, 2,4,6-trinitrotolene, dinitrotoluene, and combinations thereof.

7. The method as recited in claim 1 wherein said redox enzyme is selected from a cell membrane.

8. The method as recited in claim 7 wherein said cell membrane is selected from *e. coli*.

9. The method as recited in claim 8 wherein said redox enzyme comprises cell membrane fragments in a particulate suspension in 20 mM phosphate buffer at a neutral pH.

* * * * *